United States Patent [19]
Pearson

[11] 3,795,294
[45] Mar. 5, 1974

[54] OIL OPERATED COUPLING

[75] Inventor: Frederick Randall Pearson, Eaglemont, Australia

[73] Assignee: Humes Limited, Melbourne, Victoria, Australia

[22] Filed: Sept. 11, 1972

[21] Appl. No.: 288,239

[30] Foreign Application Priority Data
Sept. 13, 1971  Australia.............................. 6264/71

[52] U.S. Cl. .................. 192/85 AT, 188/67, 192/86
[51] Int. Cl. .......................................... F16d 25/00
[58] Field of Search 192/85 AT, 86; 287/53 R, 52.06; 188/67

[56] References Cited
UNITED STATES PATENTS
| | | | |
|---|---|---|---|
| 2,889,895 | 6/1959 | Snow | 188/67 X |
| 2,734,607 | 2/1956 | Hindmarch | 192/86 |
| 3,045,790 | 7/1962 | Becker | 192/85 AT X |
| 3,643,765 | 2/1972 | Hanchen | 188/67 |
| 3,664,236 | 5/1972 | Malott | 188/67 X |

*Primary Examiner*—Benjamin W. Wyche
*Attorney, Agent, or Firm*—Ladas, Parry, Von Gehr, Goldsmith & Deschamps

[57]  ABSTRACT

An oil-injection mounting for securing an element with respect to a shaft with which it defines an annular cavity in which fluid pressure selectively applied to a collet fixes the element with respect to the shaft by an interference fit or unfixes them by lubricating self-releasing complementarily tapered surfaces of the collet and element respectively, a source of fluid pressure being connectible to a second part of the cavity, defined by the tapered surfaces, having restricted communication with a first part in which increase of pressure tends to force the surfaces into mating contact, and which first part has a pressure release valve allowing the element and shaft to unfix when the pressure source is turned on after fixing.

1 Claim, 2 Drawing Figures

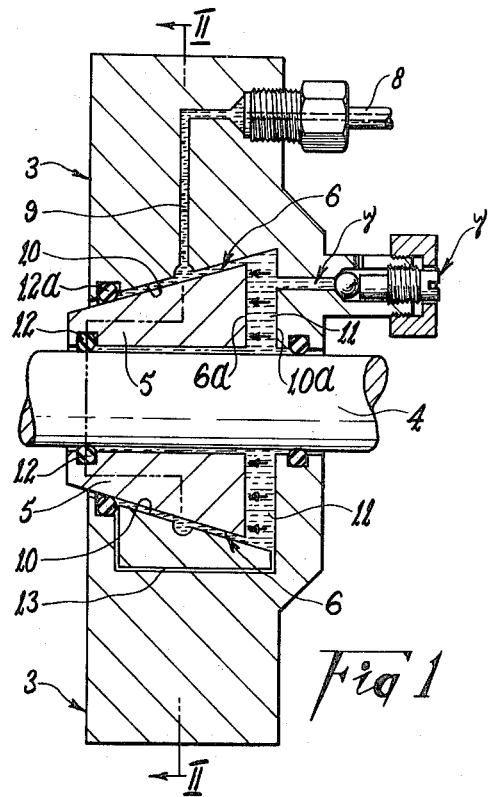
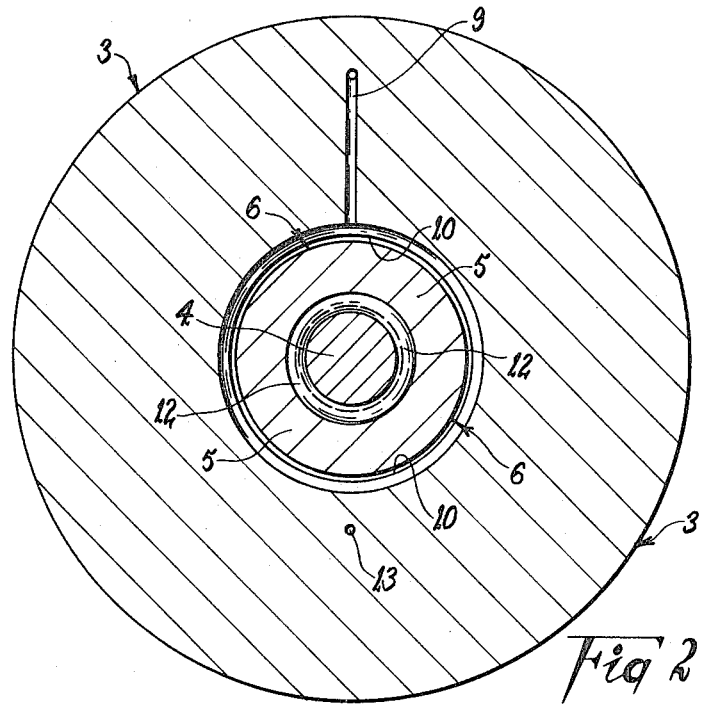

OIL OPERATED COUPLING

This invention relates to mountings of the kind used for securing an element with respect to a member such as a shaft or pipe by hydraulic pressure, and an object of the invention is to provide a mounting that can be accurately located, firmly secured and easily and quickly unfixed and relocated and secured as desired.

With that object in view, the mounting provided by the invention may include a collet adapted to fit closely and preferably slidably over the member and defining with the element a fluid pressure chamber connectible to a source of pressured fluid, the collet having a tapered surface portion complementary to a tapered internal wall part of said element whereby relative axial movement between the element and collet, due to increase of pressure in the chamber results in an interference fit therebetween, the consequential stresses so straining the collet as to cause it to contract radially so as to grip the shaft or other member under conditions of unlubricated intimate contact.

After an interval of time (usually several minutes) it may be found that the radial forces exerted on the collet extrude any fluid lubricating film from between the element and collet, giving rise to intimate unlubricated contact between these components, and hence the element is effectively fixed to the shaft or other member to which the element is applied.

The supply of fluid under pressure can be stopped as soon as the desired measure of interference or force fit has been attained between the element and collet and-/or between the collet and member. The element may be unfixed from the member by releasing the chamber pressure, and admitting fluid under pressure to the interface between the mating surface of the collet and element, giving a resultant thrust and consequential relative movement between the collet and element in the direction opposite from that in which fixing took place. The angle of taper may be so chosen that the taper is "self-releasing."

But in order that the invention may be better understood, reference will now be made to the accompanying drawings which are to be considered as part of the specification and read herewith. In the drawings:

FIG. 1 shows a preferred form of mounting means in accordance with the invention in a section plane through the axis of a uniform circular section shaft to which it is being applied, and FIG. 2 is a section across line II — II in FIG. 1.

Referring to the drawings in detail, an element in the form of mill roller 3 is being fixed to a member being a shaft 4 of uniform circular cross-section. Element 3 has an internal wall adapted to define with shaft 4 an annular cavity for pressurized fluid. A second part 10 of the internal wall forms a tapered bore of substantially circular cross-section coaxially cooperable with a complementarily tapered frustoconical collet 5 which has a bore adapted to form a close but sliding fit on shaft 4.

A first surface part 6a of the collet defines with a first part 10a of the internal wall 1 a first fluid pressure chamber 11 in which increase of pressure tends to move collet 5 relatively to element 3 in a direction axially of the member (as indicated by the arrows) so that tapered surface 6 of collet 5 tends to move into mating relationship with the tapered bore of element 3. Surfaces 6 and 10 may be part of a right circular cone tapered about one in 30, and the clearance between shaft 4 and the bore of collet 5 may advantageously be of the order of 0.0015 inch, affording a fluid film lubrication space allowing of free relative sliding (and rotational, where appropriate) movement between the collet and shaft.

Surfaces 6 and 10 define a second fluid chamber having restricted communication with the first and in which increase of pressure tends to separate 3 and 5.

To fix element 3 to shaft 4, pressure-release valve 7 is closed by rotating its spindle, and high-pressure fluid is admitted to the system through connecting pipe 8 which may lead to an external high pressure fluid pump (not shown). The fluid is forced along channel 9 to establish fluid film lubrication of collet 5. Leakage of fluid between the outer surface 6 of collet 5 and the inner surface 10 of element 3 pressurizes first chamber 11 and forces collet 5 in an axial direction towards its smaller end, resulting in an interference fit between it and element 3. This fit produces a tensile "hoop" stress in element 3 and an opposing compressive "hoop" stress in collet 5.

The element and collet may be so dimensioned that under the relevant stresses the inward radial strain of the collet exceeds the outward radial strain of the element whereby the collet firmly grips the shaft or other member to which the mounting is being applied. Any fluid film between the collet and shaft is extruded into chamber 11 and surfaces 6 and 10 are forced together into intimate unlubricated contact.

Further application of high pressure fluid continues to force collet 5 to the left thereby increasing the hoop stress in element 3 to a stage where a force fit is achieved between the collet and shaft. The flow of high pressure fluid may be cut off once the desired interference fit has been obtained.

After a few minutes, the radial forces exerted on the collet extrude any fluid remaining between surfaces 6 and 10, and intimate unlubricated contact is achieved, whereupon element 3 is effectively fixed to shaft 4.

The direction and peripheral distribution of the flow from the tapered annular region defined by surfaces 6, 10 to chamber 11 are assisted by seal 12a and passage 13, and the latter in particular tends to reduce such irregularities as may result in canting of collet 5 on the shaft.

To unfix element 3 from shaft 4, the first pressure chamber 11 is depressurized by opening valve 7, which is advantageously a low pressure regulating relief and pressure control valve, with which may be associated a spring and ball valve arrangement adapted to limit the maximum pressure in chamber 11, valve 7 desirably being provided with a safety retaining cap in the valve spindle.

When chamber 11 has been depressurized, high pressure fluid may again be admitted to the system through 8 and 9. The fluid re-establishes fluid film lubrication between surfaces 6 and 10 and, chamber 11 no longer having the pressure to resist separation between 3 and 5, these two components move relatively in an axial direction and thereby remove the "hoop" forces that had previously produced the interference fit between 3, 4 and 5. Preferably the taper angle of 6 and 10 is chosen so that the taper is self-releasing.

The mounting provided by this invention has the advantage over prior forms of oil injection mounting that it can be positioned anywhere along a shaft or other element of constant cross-section, and accurate location of the position may be achieved by regulating the flow of high pressure fluid. When positioned it remains fixed in that position until the pressure in the chamber be released and fluid re-injected between the element and collet. In the particular case of the relevant parts being of circular cross-section, element 1 may be rotated through any desired angle and there fixed to the shaft.

Fixing and unfixing generally takes substantially less time (often as little as half a minute) with the present invention than with prior forms of mounting.

Furthermore, the process of fixing and unfixing are both carried out by a single source of pressurized fluid, and the process may be selected by one control device. The system does not require the continued application of fluid pressure to maintain the fixing. Fluid pressure from the supply is required only during fixing and unfixing of the relevant parts.

Having now described our invention, what we claim as new and desire to secure by Letters Patent is:

1. A fluid injection mounting for releasably securing an element to a shaft or the like, comprising an annular cavity defined by the shaft and an internal wall of the element, a movable tapered collet surrounding the shaft with a close sliding fit and having at least a portion thereof located in said cavity, a first fluid pressure chamber forming a portion of said cavity and defined by the larger end of the tapered collet and part of the internal wall of the element, a second fluid pressure chamber forming another portion of said cavity and defined by the tapered periphery of the collet and a corresponding tapered periphery of the collet and a corresponding tapered part of the internal wall of the element and having restricted communication with the first chamber, means for introducing fluid under pressure to the second chamber to lubricate the same and pressurize the first chamber to force the collet axially along the shaft to extrude fluid from between the respective adjacent surfaces of the shaft, the collet and the member and produce an unlubricated interference fit between the tapered periphery of the collet and the element and a resulting unlubricated force fit between the radially compressed collet and shaft to secure the element to the shaft through the collet, and including means for releasing the pressure in the first chamber to release the element from the collet and shaft.

* * * * *